United States Patent
Nissinen et al.

(10) Patent No.: US 10,777,016 B2
(45) Date of Patent: Sep. 15, 2020

(54) SYSTEM AND METHOD OF ENHANCING USER'S IMMERSION IN MIXED REALITY MODE OF DISPLAY APPARATUS

(71) Applicant: Varjo Technologies Oy, Helsinki (FI)

(72) Inventors: Joonas Nissinen, Espoo (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/738,302

(22) Filed: Jan. 9, 2020

(65) Prior Publication Data
US 2020/0151959 A1    May 14, 2020

Related U.S. Application Data

(62) Division of application No. 15/898,448, filed on Feb. 17, 2018, now Pat. No. 10,565,797.

(51) Int. Cl.
*G06T 19/20*    (2011.01)
*G06T 7/00*    (2017.01)
(Continued)

(52) U.S. Cl.
CPC .......... *G06T 19/006* (2013.01); *G02B 27/017* (2013.01); *G06F 3/005* (2013.01);
(Continued)

(58) Field of Classification Search
CPC ............... G06T 19/006; G06T 7/194; G06K 2009/4657
(Continued)

(56) References Cited

U.S. PATENT DOCUMENTS 8,311,384 B2 * 11/2012 Raghoebardajal ........ G06T 7/20
345/632
2015/0312468 A1 10/2015 Taylor et al.
(Continued)

FOREIGN PATENT DOCUMENTS

EP    2462564 A2    6/2012
WO    2018000304 A1    1/2018

OTHER PUBLICATIONS

International Searching Authority, Invitation to Pay Additional Fees, Application No. PCT/FI2019/050083, dated Apr. 12, 2019, 17 pages.
(Continued)

*Primary Examiner* — Thomas J Lett
(74) *Attorney, Agent, or Firm* — Ziegler IP Law Group, LLC

(57) ABSTRACT

A system and a method for enhancing a user's immersion in a mixed reality mode of head-mounted display apparatus, the system being at least communicably coupled to the aforesaid display apparatus. The system includes at least one camera communicably coupled to a processor. The processor controls said camera to capture sequence of images of real-world environment; analyse sequence of images to identify spatial geometry of real objects in real-world environment and material categories to which real objects belong; process sequence of images to generate sequence of mixed-reality images, based upon spatial geometry and material category of at least one real object that is represented by at least one virtual object in sequence of mixed-reality images, wherein visual behaviour of at least one virtual object emulates at least one material property associated with material category of the at least one real object; and render the sequence of mixed-reality images.

20 Claims, 4 Drawing Sheets

(51) Int. Cl.
  *G06T 19/00* (2011.01)
  *G02B 27/01* (2006.01)
  *G06F 3/01* (2006.01)
  *G06F 3/00* (2006.01)
  *G06F 3/0481* (2013.01)

(52) U.S. Cl.
  CPC .............. *G06F 3/012* (2013.01); *G06F 3/013* (2013.01); *G06F 3/016* (2013.01); *G06F 3/04815* (2013.01); *G06T 19/20* (2013.01); *G02B 2027/0138* (2013.01); *G02B 2027/0141* (2013.01)

(58) Field of Classification Search
  USPC ........................................................ 345/633
  See application file for complete search history.

(56) References Cited

U.S. PATENT DOCUMENTS

| | | |
|---|---|---|
| 2015/0347854 A1 | 12/2015 | Bare et al. |
| 2016/0035132 A1 | 2/2016 | Shuster et al. |
| 2016/0224657 A1 | 8/2016 | Mullins |
| 2016/0228770 A1 | 8/2016 | Hall |
| 2017/0293348 A1* | 10/2017 | Lee .......................... G06F 3/011 |
| 2017/0358141 A1 | 12/2017 | Stafford et al. |
| 2018/0260026 A1* | 9/2018 | Drake ................ G02B 27/0093 |

OTHER PUBLICATIONS

Notification of Transmittal of the International Search Report and The Written Opinion of the International Searching Application No. PCT/FI2019/050083, dated May 29, 2019, 23 pages.

* cited by examiner

SYSTEM AND METHOD OF ENHANCING USER'S IMMERSION IN MIXED REALITY MODE OF DISPLAY APPARATUS

TECHNICAL FIELD

The present disclosure relates generally to mixed reality display apparatuses; and more specifically, to systems for enhancing a user's immersion in a mixed reality mode of a head-mounted display apparatus, such systems comprising cameras and processors. Furthermore, the present disclosure also relates to methods of enhancing the user's immersion in the mixed reality mode of the head-mounted display apparatus, via the aforementioned systems. Moreover, the present disclosure also relates to computer program products comprising a non-transitory machine-readable data storage medium having program instructions stored thereon, the program instructions being accessible by a processing device to execute the aforementioned methods.

BACKGROUND

In recent times, there have been rapid advancements in technologies such as virtual reality, augmented reality, mixed reality, and the like, to present interactive simulated environments to users of specialized devices. Specifically, such simulated environments relate to fully virtual environments (namely, virtual reality environments) as well as real world environments including simulated objects therein (namely, augmented reality environments, mixed reality environments). Furthermore, the technologies that allow for providing the aforesaid simulated environments include virtual reality, augmented reality, mixed reality, and the like. Presently, the users utilize the specialized devices (for example, such as virtual reality headsets, augmented reality glasses, augmented reality headsets, augmented reality glasses, mixed reality headsets, mixed reality glasses, and the like) for experiencing and interacting with such simulated environments.

Typically, in a mixed reality environment, a user of a specialized device is presented with simulated objects (namely, computer-generated objects) overlaid upon his/her real-world environment (namely, his/her actual surroundings). In such a mixed reality environment, the user interacts with both the simulated objects and real-world objects in his/her real-world environment. Generally, for enhancing immersiveness of the user within the mixed reality environment, the specialized device includes equipment for capturing images of the real-world environment and processing such captured images to analyze spatial geometry of the real-world environment. This allows for the specialized device to effectively overlay the simulated objects upon the real-world environment.

However, existing specialized devices are limited in their ability to provide a truly immersive mixed reality experience to the user. Notably, the existing specialized devices acquire limited (namely, basic) information pertaining to the real-world environment, and consequently decipher very few semantics of the real-world environment. Therefore, such specialized devices provide sub-optimal perception of reality within the mixed reality environment since they allow for limited interaction between the simulated objects and the objects in the real-world environment. As an example, in existing mixed reality environments, if the user throws a computer-generated leather ball upon a glass table in the real-world environment, the glass table does not break, since it is only perceived geometrically as a table and is not perceived as table made of glass.

Therefore, in light of the foregoing discussion, there exists a need to overcome the aforementioned drawbacks associated with conventional mixed-reality devices.

SUMMARY

The present disclosure seeks to provide a system for enhancing a user's immersion in a mixed reality mode of a head-mounted display apparatus. The present disclosure also seeks to provide a method of enhancing a user's immersion in a mixed reality mode of a head-mounted display apparatus. The present disclosure seeks to provide a solution to the existing problems associated with providing immersive mixed reality experiences to a user of a head-mounted display apparatus. An aim of the present disclosure is to provide a solution that overcomes at least partially the problems encountered in the prior art, and provides an efficient, fast and reliable system and method that allows for enhancing the user's immersion in the mixed reality mode of the head-mounted display apparatus by providing a realistic, interactive and truly immersive mixed reality environment to the user.

In a first aspect, an embodiment of the present disclosure provides a system for enhancing a user's immersion in a mixed reality mode of a head-mounted display apparatus, the system being at least communicably coupled to the head-mounted display apparatus, the system comprising:
  at least one camera; and
  a processor communicably coupled to the at least one camera, wherein the processor is configured to:
    (i) control the at least one camera to capture a sequence of images of a given real-world environment;
    (ii) analyze the sequence of images to identify a spatial geometry of real objects present in the given real-world environment;
    (iii) analyze the sequence of images to identify material categories to which the real objects or their portions belong, wherein each real object or its portion belongs to its corresponding material category;
    (iv) process the sequence of images to generate a sequence of mixed-reality images, based upon the spatial geometry and the material category of at least one real object from amongst the real objects, wherein the at least one real object is to be represented by at least one virtual object in the sequence of mixed-reality images, the sequence of mixed-reality images is to be generated in a manner that a visual behaviour of the at least one virtual object in the sequence of mixed-reality images emulates at least one material property associated with the material category of the at least one real object; and
    (v) render, at the head-mounted display apparatus, the sequence of mixed-reality images.

In a second aspect, an embodiment of the present disclosure provides a method of enhancing a user's immersion in a mixed reality mode of a head-mounted display apparatus, the method comprising:
  (i) capturing, via at least one camera, a sequence of images of a given real-world environment;
  (ii) analyzing the sequence of images to identify a spatial geometry of real objects present in the given real-world environment;
  (iii) analyzing the sequence of images to identify material categories to which the real objects or their portions belong, wherein each real object or its portion belongs to its corresponding material category;

(iv) processing the sequence of images to generate a sequence of mixed-reality images, based upon the spatial geometry and the material category of at least one real object from amongst the real objects, wherein the at least one real object is represented by at least one virtual object in the sequence of mixed-reality images, the sequence of mixed-reality images is generated in a manner that a visual behaviour of the at least one virtual object in the sequence of mixed-reality images emulates at least one material property associated with the material category of the at least one real object; and (v) rendering, at the head-mounted display apparatus, the sequence of mixed-reality images.

In a third aspect, an embodiment of the present disclosure provides a computer program product comprising a non-transitory machine-readable data storage medium having stored thereon program instructions that, when accessed by a processing device, cause the processing device to:

(i) receive, from at least one camera, a sequence of images of a given real-world environment, the at least one camera being communicably coupled to the processing device;

(ii) analyze the sequence of images to identify a spatial geometry of real objects present in the given real-world environment;

(iii) analyze the sequence of images to identify material categories to which the real objects or their portions belong, wherein each real object or its portion belongs to its corresponding material category;

(iv) process the sequence of images to generate a sequence of mixed-reality images, based upon the spatial geometry and the material category of at least one real object from amongst the real objects, wherein the at least one real object is to be represented by at least one virtual object in the sequence of mixed-reality images, the sequence of mixed-reality images is to be generated in a manner that a visual behaviour of the at least one virtual object in the sequence of mixed-reality images emulates at least one material property associated with the material category of the at least one real object; and (v) render, at a head-mounted display apparatus, the sequence of mixed-reality images, the head-mounted display apparatus being communicably coupled to the processing device.

Embodiments of the present disclosure substantially eliminate or at least partially address the aforementioned problems in the prior art, and allow for enhancing the user's immersion in the mixed reality mode of the head-mounted display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
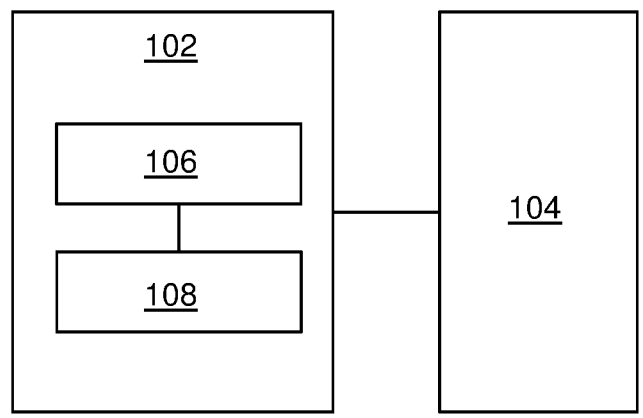
FIGS. 1A and 1B illustrate block diagrams of architectures of a system and a head-mounted display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a a system for enhancing a user's immersion in a mixed reality mode of a head-mounted display apparatus, the system being at least communicably coupled to the head-mounted display apparatus, the system comprising:

at least one camera; and a processor communicably coupled to the at least one camera, wherein the processor is configured to:

(i) control the at least one camera to capture a sequence of images of a given real-world environment;

(ii) analyze the sequence of images to identify a spatial geometry of real objects present in the given real-world environment;

(iii) analyze the sequence of images to identify material categories to which the real objects or their portions belong, wherein each real object or its portion belongs to its corresponding material category;

(iv) process the sequence of images to generate a sequence of mixed-reality images, based upon the spatial geometry and the material category of at least one real object from amongst the real objects, wherein the at least one real object is to be represented by at least one virtual object in the sequence of mixed-reality images, the sequence of mixed-reality images is to be generated in a manner that a visual behaviour of the at least one virtual object in the sequence of mixed-reality images emulates at least one material property associated with the material category of the at least one real object; and (v) render, at the head-mounted display apparatus, the sequence of mixed-reality images.

In another aspect, an embodiment of the present disclosure provides a method of enhancing a user's immersion in a mixed reality mode of a head-mounted display apparatus, the method comprising:

(i) capturing, via at least one camera, a sequence of images of a given real-world environment;

(ii) analyzing the sequence of images to identify a spatial geometry of real objects present in the given real-world environment;

(iii) analyzing the sequence of images to identify material categories to which the real objects or their portions belong, wherein each real object or its portion belongs to its corresponding material category;

(iv) processing the sequence of images to generate a sequence of mixed-reality images, based upon the spatial geometry and the material category of at least one real object from amongst the real objects, wherein the at least one real object is represented by at least one virtual object in the sequence of mixed-reality images, the sequence of mixed-reality images is generated in a manner that a visual behaviour of the at least one virtual object in the sequence of mixed-reality images emulates at least one material property associated with the material category of the at least one real object; and (v) rendering, at the head-mounted display apparatus, the sequence of mixed-reality images.

In yet another aspect, an embodiment of the present disclosure provides a computer program product comprising a non-transitory machine-readable data storage medium having stored thereon program instructions that, when accessed by a processing device, cause the processing device to:

(i) receive, from at least one camera, a sequence of images of a given real-world environment, the at least one camera being communicably coupled to the processing device;

(ii) analyze the sequence of images to identify a spatial geometry of real objects present in the given real-world environment;

(iii) analyze the sequence of images to identify material categories to which the real objects or their portions belong, wherein each real object or its portion belongs to its corresponding material category;

(iv) process the sequence of images to generate a sequence of mixed-reality images, based upon the spatial geometry and the material category of at least one real object from amongst the real objects, wherein the at least one real object is to be represented by at least one virtual object in the sequence of mixed-reality images, the sequence of mixed-reality images is to be generated in a manner that a visual behaviour of the at least one virtual object in the sequence of mixed-reality images emulates at least one material property associated with the material category of the at least one real object; and (v) render, at a head-mounted display apparatus, the sequence of mixed-reality images, the head-mounted display apparatus being communicably coupled to the processing device.

The present disclosure provides the aforementioned system, method and computer program product. The system described herein acquires comprehensive information pertaining to the given real-world environment, for example, such as, the spatial geometry and the material categories of the real objects present in the given real-world environment. Therefore, such a system deciphers considerable semantics of the given real-world environment, thereby, allowing for providing the user of the head-mounted display apparatus with an optimal mixed reality experience. Notably, the described system, method and computer program product enable considerable, realistic interaction between real and simulated objects represented within the sequence of mixed reality images. Beneficially, the described system is robust and efficient, and the described method is systematic and fast.

Throughout the present disclosure, the term "head-mounted display apparatus" used herein relates to specialized equipment for presenting a simulated environment to the user, when the head-mounted display apparatus is worn by the user on his/her head. In such an instance, the head-mounted display apparatus is operable to act as a device for presenting the simulated environment to the user. Optionally, the head-mounted display apparatus is configured to operate in at least one of: a virtual reality mode, an augmented reality mode, a mixed reality mode for presenting at least one of: a virtual reality environment, an augmented reality environment, a mixed reality environment, respectively, to the user. For example, the head-mounted display apparatus may be operated in the mixed reality mode to present the mixed reality environment to the user, wherein the mixed reality environment represents at least one simulated object (namely, at least one computer-generated object) overlaid upon the given real-world environment of the user.

Throughout the present disclosure, the term "system" used herein relates to equipment configured to produce images to be displayed to the user via the head-mounted display apparatus, and render such images at the head-mounted display apparatus. It will be appreciated that the aforesaid images produced by the system are employed to present the simulated environment to the user of the head-mounted display apparatus. Beneficially, the system allows for enhancing the user's immersion in the mixed reality mode of the head-mounted display apparatus by acquiring comprehensive information pertaining to the given real-world environment and using such acquired information whilst producing the sequence of mixed-reality images. Consequently, the sequence of mixed-reality images provide a realistic mixed reality environment to the user when he/she operates the head-mounted display apparatus in the mixed reality mode.

It will be appreciated that the system and the head-mounted display apparatus constitute a video see-through arrangement. Notably, such a video see-through arrangement utilizes images of the given real-world environment whilst providing the mixed reality environment to the user of the head-mounted display apparatus.

Notably, the system is at least communicably coupled to the head-mounted display apparatus to allow for communication therebetween. Additionally, optionally, the system is physically coupled to the head-mounted display apparatus.

In an implementation, the system is integrated with a remote device. In such a case, the at least one camera and the processor are mounted on the remote device, and are therefore external to the head-mounted display apparatus. Furthermore, in such an implementation, the remote device may be positioned within the given real-world environment whereas the user of the head-mounted display apparatus may be positioned away from (namely, at a distance from) the remote device. Therefore, in such an implementation, the system may be only communicably coupled with the head-mounted display apparatus wirelessly (namely, via a wireless interface). For example, the processor (of the system) may be wirelessly coupled to the head-mounted display apparatus. Optionally, the remote device is one of: a drone, a robot.

In another implementation, the system is integrated with the head-mounted display apparatus. In such a case, the processor may be arranged within the head-mounted display apparatus and the at least one camera may be mounted, for example, on an outer surface of the head-mounted display apparatus, such that the at least one camera faces the given real-world environment. Therefore, in such an implementation, the system may be both physically coupled and communicably coupled with the head-mounted display apparatus. In one scenario, the processor is communicably coupled with the head-mounted display apparatus by way of wires (namely, in a wired manner). Alternatively, the processor is communicably coupled with the head-mounted display apparatus wirelessly (namely, via a wireless interface).

Throughout the present disclosure, the term "at least one camera" relates to equipment that is operable to receive and process light from the given real-world environment, to capture the sequence of images of the given real-world environment. The at least one camera could be a two-dimensional camera or a three-dimensional camera. The two-dimensional camera allows for capturing two-dimensional images of the given real-world environment whereas the three-dimensional camera allows for capturing three-dimensional images of the given real-world environment. Beneficially, such three-dimensional images provide depth information of the given real-world environment. Examples of the at least one camera include, but are not limited to, a digital camera, an RGB-D camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared camera, a multispectral camera, a hyperspectral camera and an ultrasound imaging equipment.

Optionally, the at least one camera comprises at least one lens, an image sensor and a plurality of optical filters. In an embodiment, the plurality of optical filters are arranged on an optical path of light from the given real-world environment, between the at least one lens and the image sensor. In another embodiment, the plurality of optical filters are arranged on an optical path of light from the given real-world environment, wherein the at least one lens is arranged between the plurality of optical filters and the image sensor. In operation, the at least one lens is configured to focus the light from the given real-world environment onto the image sensor. The plurality of optical filters are operable to filter the light from the given real-world environment prior to incidence of such light upon the image sensor. Notably, the plurality of optical filters only allow light of desired spectral band(s) to pass therethrough towards the image sensor.

Optionally, the at least one lens is implemented by at least one of: a convex lens, a plano-convex lens, a concave lens, a plano-concave lens, an aspheric lens. Optionally, the image sensor comprises a plurality of photo-sensitive elements. Examples of the plurality of photo-sensitive elements include, but are not limited to, photodiodes, photoresistors, phototransistors, and photosensitive field effect transistors. Optionally, the plurality of optical filters are implemented by way of: a Fabry-Perot Interferometer, a Plasmonic filter, a Liquid Crystal tunable filter, bandpass filters, colour filters. Optionally, the plurality of optical filters are integrated into a single chip.

Optionally, the plurality of optical filters is integrated with the image sensor as a single unit.

In an example, the at least one camera is implemented by way of a multispectral camera that is configured to capture the sequence of images of the given real-world environment across a plurality of spectral bands. In such an example, the multispectral camera may allow for imaging the given real-world environment across 5 spectral bands, wherein 2 spectral bands belong to infrared wavelengths and 3 spectral bands belong to visible wavelengths of the electromagnetic spectrum. In another example, the at least one camera is implemented by way of a hyperspectral camera that is configured to capture the sequence of images of the given real-world environment across a plurality of spectral bands. In such an example, the hyperspectral camera may allow for imaging the given real-world environment across 150 spectral bands, wherein 80 spectral bands belong to infrared wavelengths and 70 spectral bands belong to visible wavelengths of the electromagnetic spectrum. It will be appreciated that number of spectral bands associated with the multispectral camera is lesser than number of spectral bands associated with the hyperspectral camera. Optionally, bandwidth of the plurality of spectral bands associated with the multispectral camera is higher than bandwidth of the plurality of spectral bands associated with the hyperspectral camera.

The processor is communicably coupled to the at least one camera. In an embodiment, the processor is implemented by way of hardware, software, firmware or a combination of these, suitable for controlling operation of the system. It will be appreciated that the processor controls the operation of the system to allow for substantially enhancing the user's immersion in the mixed reality mode of the head-mounted display apparatus.

The processor is configured to control the at least one camera to capture the sequence of images of the given real-world environment. Notably, the sequence of images represent the real objects present in the given real-world environment. Optionally, the sequence of images are captured from a plurality of perspectives. Beneficially, such a sequence of images allows for acquiring accurate spatial information of the given real-world environment.

Optionally, the sequence of images are captured within a pre-determined time period. In such a case, the aforesaid sequence of images provide temporal information pertaining to the given real-world environment. Therefore, changes in the given real-world environment that occur within the pre-determined time period are represented in the sequence of images. The pre-determined time period may be, for example, 5 seconds, 10 seconds, 15 seconds, 20 seconds, 25 seconds, 30 seconds, 35 seconds, 40 seconds, 45 seconds, 50 seconds, 55 seconds, or 60 seconds. As an example, if any of the real objects present in the given real-world environment are in motion, the sequence of images may beneficially represent change(s) in position of such moving real objects that occur within the pre-determined time period. As another example, if any of the real objects present in the given real-world environment have a variable state (for example, such as variable colour, shape, size, and the like), the sequence of images may represent change(s) in state of such objects that occur within the pre-determined time period.

Alternatively, optionally, the sequence of images are captured substantially simultaneously.

In an example implementation, the processor may control a plurality of two-dimensional digital cameras to capture the sequence of images of the given real-world environment within a 15 second time period. In another example implementation, the processor may control a three-dimensional Time-of-Flight camera and two two-dimensional digital cameras to capture the sequence of images of the given real-world environment within a 10 second time period.

Optionally, the processor is configured to capture the sequence of images of the given real-world environment across the plurality of spectral bands. Optionally, in this regard, the captured sequence of images depict substantially similar views of the given real-world environment. In an example, the multispectral camera may capture a sequence of 10 images of the given real-world environment having substantially similar view. In such an example, 4 images of the given real-world environment may be captured across a spectral band ranging from 400 nanometre to 600 nanometre wavelengths, 4 images of the given real-world environment may be captured across a spectral band ranging from 650 nanometre to 700 nanometre wavelengths, and 2 images of the given real-world environment may be captured across a spectral band ranging from 750 nanometre to 850 nanometre wavelengths.

The processor is configured to analyze the sequence of images to identify the spatial geometry of the real objects present in the given real-world environment. Throughout the present disclosure, the term "spatial geometry" relates to shapes and relative arrangements of the real objects present in the given real-world environment. Optionally, the processor is configured to generate a spatial map of the given real-world environment, based upon identification of the spatial geometry of the real objects present in the given real-world environment.

Optionally, the processor is configured to employ at least one computer vision algorithm at (ii), to identify the spatial geometry of the real objects present in the given real-world environment. The at least one computer vision algorithms processes the sequence of images to extract the aforesaid spatial geometry information therefrom. Optionally, the at least one computer vision algorithm is selected from the group consisting of: Simultaneous Localization and Mapping (SLAM) algorithm, Structure from Motion (SfM) algorithm, Scale-Invariant Feature Transform (SIFT), and Speeded-Up Robust Features (SURF) algorithm.

Additionally or alternatively, optionally, the processor is configured to train at least one convolutional neural network using at least one deep learning algorithm at (ii), to identify the spatial geometry of the real objects. Consequently, the trained at least one convolutional neural network identifies the spatial geometry of the real objects present in the given real-world environment. It will be appreciated that repetitive use of the at least one deep learning algorithm to train the at least one convolutional neural network facilitates the at least one convolutional neural network to become 'smart' over time. Furthermore, optionally, the aforesaid identification of the spatial geometry of the real objects occurs in real time or near-real time.

The processor is configured to analyze the sequence of images to identify the material categories to which the real objects or their portions belong, wherein each real object or its portion belongs to its corresponding material category. Such an analyzing operation to identify the material categories of the real objects may also be referred to as 'material segmentation' of the given real-world environment. Optionally, the processor is configured to partition the sequence of images into a plurality of segments, based upon the spatial geometry of the real objects present in the given real-world environment, and identify the material categories to which the plurality of segments belong.

It is to be understood that the term "material category" used herein relates to a type of material that a given real object could be made of. Notably, the given real object could be made of a single material or a plurality of materials. In an instance when the given real object is made of the plurality of materials, different portions of the given object could be made of different materials. Examples of the material categories include, but are not limited to, fabric, stone, metal, wood, foliage, plastic, glass, brick, water, leather, painted and tile.

Optionally, a given material category comprises at least one material associated therewith. As an example, a 'plastic' material category may comprise polyethylene terephthalate, unplasticised polyvinyl chloride, polypropylene and polystyrene. As another example, a 'glass' material category may comprise toughened glass, mirrored glass, borosilicate glass, patterned glass and flexible glass. As yet another example, a 'fabric' material category may comprise cotton, polyester, silk, nylon, wool, lace, and jute.

In an example, a couch present in the given real-world environment may be entirely made of top grain leather. Therefore, the processor may identify a material category to which the couch belongs as 'leather'. In another example, a food storage container present in the given real-world environment may be made of two materials, wherein a body of the food storage container is made of borosilicate glass and a lid of the food storage container is made of polypropylene. Therefore, the processor may identify a material category to which the body of the food storage container belongs as 'glass' and a material category to which the lid of the food storage container belongs as 'plastic'. In yet another example, a table present in the given real-world environment may be made of two materials, wherein a base frame (namely, a bottom portion) of the table is made of teak wood and a top portion of the table is made of patterned glass. Therefore, the processor may identify a material category to which the base frame of the table belongs as 'wood' and a material category to which the top portion of the table belongs as 'glass'.

Optionally, the processor is configured to train at least one convolutional neural network using at least one deep learning algorithm at (iii), to identify the material categories to which the real objects or their portions belong. Optionally, in this regard, the processor employs at least one material database whilst training the at least one convolutional neural network. Therefore, the at least one deep learning algorithm allows for supervised learning of the at least one convolutional neural network. Consequently, the trained at least one convolutional neural network identifies the material categories of each real object or its portions. It will be appreciated that material databases having substantially large datasets (for example, datasets comprising few hundred thousand material samples) allow for providing substantially large training data for the at least one convolutional neural network. Furthermore, material databases having a substantially large number of samples pertaining to substantially-uncommon material categories allow for correctly identifying a diverse range of both common materials and uncommon materials. Therefore, by employing the aforesaid material databases, the material categories to which the real objects or their portions belong are identified with a high degree of accuracy.

Optionally, the aforesaid identification of the material categories to which the real objects or their portions belong occurs in real time or near-real time.

Optionally, when the processor is configured to capture the sequence of images of the given real-world environment across the plurality of spectral bands, the processor is further configured to process the sequence of images to generate a spectral response of the real objects present in the given real-world environment, and analyze the spectral response to identify the material categories to which the real objects or their portions belong. The spectral response of the real objects relates to a variation of absorption or reflectance characteristics of the material category of the real objects with respect to wavelength (that is employed for capturing the sequence of images of the given real-world environment including the real objects). It will be appreciated that different objects are associated with different absorption characteristics and reflectance characteristics, based upon their constituent material categories. Therefore, upon analysing spectral footprints (namely, absorption or reflectance value) of the real objects, the material categories to which the real objects or their portions belong can be identified accurately.

As an example, in a given real-world environment having a box and an aluminium sheet therein, a spectral response of the box and the aluminium sheet may represent spectral footprints of the aforesaid objects at a 680 nanometre wavelength (visible radiation) and a 780 nanometre wavelength (infrared radiation). In such an example, the spectral response may represent that whilst both the box and the aluminium sheet reflect the 680 nanometre light, the box absorbs the 780 nanometre light and the aluminium sheet reflects the 780 nanometre light. Therefore, the box may be associated with 'wood' material category and the aluminium foil may be associated with 'metal' material category.

The processor is configured to process the sequence of images to generate the sequence of mixed-reality images, based upon the spatial geometry and the material category of the at least one real object from amongst the real objects. Notably, the sequence of mixed-reality images substantially represent the identified spatial geometry and the identified material category of the at least one real object. It will be appreciated that at a given time instant, the sequence of mixed-reality images may depict only a portion (namely, a region) of the given real-world environment including the at least one object, and therefore may not depict all the real objects present in the given real-world environment.

In the sequence of mixed-reality images, the at least one real object is to be represented by the at least one virtual object. Throughout the present disclosure, the term "virtual object" used herein relates to a depiction (namely, a visual representation) of the at least one real object within the sequence of mixed-reality images. Furthermore, the term "virtual object" also relates to the at least one simulated object that is to be overlaid upon the at least one real object represented in the sequence of mixed-reality images. Therefore, it is to be understood that a given mixed-reality image represents a plurality of virtual objects therein, wherein the plurality of virtual objects comprise (a) the at least one virtual object that is representative of the at least one real object, and (b) the at least one virtual object that is representative of the at least one simulated object. Examples of the at least one simulated object include, but are not limited to, a simulated navigation tool (for example, such as a simulated map, a simulated direction signage, and so forth), a simulated gadget (for example, such as a simulated calculator, a simulated computer, and so forth), a simulated message (for example, such as a simulated instant message, a simulated chat conversation, a simulated to-do note, and so forth), a simulated entity (for example, such as a simulated person, a simulated animal, and so forth), a simulated entertainment media (for example, such as a simulated video, a simulated interactive advertisement, and so forth), and a simulated information (for example, such as a simulated news description, a simulated announcement, simulated data, and so forth).

The sequence of mixed-reality images is to be generated in a manner that the visual behaviour of the at least one virtual object in the sequence of mixed-reality images emulates at least one material property associated with the material category of the at least one real object. In such a case, the visual behaviour of the at least one virtual object pertains to an expected visible (namely, viewable) behaviour of the at least one virtual object, when the sequence of mixed-reality images are rendered at (v) to provide the mixed reality environment to the user. Furthermore, the visual behaviour of the at least one virtual object pertains to, but is not limited to, appearance of the at least one virtual object, visible interaction of the at least one virtual object with other virtual object(s) and visible interaction of the at least one virtual object with the user. Notably, the visual behaviour of the at least one virtual object is based upon the at least one material property associated with the material category of the at least one real object. Examples of the at least one material property include, but are not limited to, colour, surface finish, light reflectivity, luminosity, light absorbance, light transmittance, elasticity, flexibility, specific strength, durability, ductility, hardness, brittleness, compressive strength, ductility, resilience, acoustic absorption and acoustic reflection. It will be appreciated that visually emulating the at least one material property associated with the material category of the at least one real object allows for providing the realistic mixed reality environment to the user, since upon such visual emulation, the at least one virtual object in the mixed reality environment appears to visually interact in a substantially-similar manner as actual objects in real-world environments would do. Therefore, the user's immersion in the mixed reality mode of the head-mounted display apparatus is considerably enhanced.

The processor is configured to render, at the head-mounted display apparatus, the sequence of mixed-reality images. Optionally, in this regard, the head-mounted display apparatus comprises at least one image renderer, wherein the processor is configured to render the sequence of mixed-reality images at the at least one image renderer. Throughout the present disclosure, the term "image renderer" relates to equipment configured to facilitate rendering of the sequence of mixed-reality images. It will be appreciated that the sequence of mixed-reality images are rendered to present the mixed reality environment to the user, when the user operates the head-mounted display apparatus in the mixed reality mode. Optionally, the sequence of mixed-reality images are rendered sequentially to produce a sequence of visual scenes (for example, representing a video of the mixed reality environment).

Optionally, the at least one image renderer is implemented by way of at least one display. More optionally, the at least one display is selected from the group consisting of: a Liquid Crystal Display (LCD), a Light Emitting Diode (LED)- based display, an Organic LED (OLED)-based display, a micro OLED-based display, and a Liquid Crystal on Silicon (LCoS)-based display.

Optionally, the at least one image renderer is implemented by way of at least one projector and a projection screen associated therewith. More optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Optionally, the visual behaviour of the at least one virtual object is to be indicative of at least one of: an expected physical interaction between the at least one virtual object and at least one other virtual object, a lighting effect expected from a surface of the at least one real object. Generally, in real-world environments, physical interactions between objects and lighting effects associated with the objects are based upon (namely, affected by) material properties associated with materials that the objects are made up of. As an example, physical interactions such as collisions between the objects are mandated by elasticity of materials of the colliding objects. As another example, lighting effects expected from a surface of an object are based upon surface finish and light reflectivity of a material of the surface. Therefore, the at least one material property associated with the material category of the at least one virtual object is leveraged to realistically depict the aforesaid expected physical interaction and/or the lighting effect within the sequence of mixed-reality images. It will be appreciated that such visual behaviour of the at least one virtual object in the sequence of mixed-reality images can be beneficially employed in graphics-intensive mixed reality environments (for example, such as mixed-reality gaming environments) for enhancing the user's engagement therein.

In an example, a given real-world environment E1 may include a window and a pillow present therein. Upon analysis of the sequence of images of such a real-world environment E1, the window may be identified to belong to 'glass' material category and the pillow may be identified to belong to 'fabric' material category. Furthermore, in a sequence of mixed-reality images corresponding to the given real-world environment E1, the window and the pillow may be represented as virtual objects. Moreover, the sequence of mixed-reality images may also represent a simulated cork ball as another virtual object. In such an example, in a first instance, the sequence of mixed-reality images may be generated in a manner that an expected physical interaction between the window and the ball emulates at least one material property associated with the material categories of the window and the ball. For example, the 'glass' material category may be associated with high brittleness and a 'wood' material category of the ball may be associated with high specific strength. Therefore, the expected physical interaction between the window and the ball may be breakage of the window when the ball is thrown to hit the window, and the sequence of mixed-reality images may be generated to emulate such breakage of the window. Furthermore, in such an example, in a second instance, the sequence of mixed-reality images may be generated in a manner that an expected physical interaction between the pillow and the ball emulates at least one material property associated with the material categories of the pillow and the ball. For example, the 'fabric' material category may be associated with high flexibility. Therefore, the expected physical interaction between the pillow and the ball may be temporary deformation of shape of the pillow when the ball is thrown to hit the pillow, and the sequence of mixed-reality images may be generated to emulate such deformation of the shape of the pillow.

In another example, a given real-world environment E2 may include a mirror present therein. Upon analysis of the sequence of images of such a real-world environment E2, the mirror may be identified to belong to 'glass' material category. Furthermore, in the sequence of mixed-reality images corresponding to the given real-world environment E2, the mirror may be represented as a virtual object. Moreover, the sequence of mixed-reality images may also represent a simulated lamp as another virtual object. In such an example, the sequence of mixed-reality images may be generated in a manner that an expected lighting effect from a mirrored glass surface of the mirror emulates at least one material property associated with the material category of the mirror. For example, the 'glass' material category may be associated with high light-reflectivity. Therefore, the expected lighting effect from the mirrored glass surface may be specular reflection of light emanating from the lamp, when such light is incident upon the mirrored glass surface. In such a case, the sequence of mixed-reality images may be generated to emulate such specular reflection of light.

Optionally, the processor is configured to generate and store a three-dimensional model representing the spatial geometry and the material categories of the real objects in the given real-world environment, and to utilize the three-dimensional model to generate the sequence of mixed-reality images at (iv). Optionally, in this regard, the three-dimensional model is stored at a memory unit communicably coupled to the processor. In one embodiment, the head-mounted display apparatus comprises the memory unit. In another embodiment, the remote device comprises the memory unit. It will be appreciated that the three-dimensional model integrates the identified spatial geometry and the material categories of the real objects in the given real-world environment into a single data structure. In such a case, while generating the sequence of mixed-reality images at (iv), the at least one real object to be represented therein is mapped onto (namely, associated with) its corresponding portion of the three-dimensional model. Therefore, the spatial geometry and the material categories associated with such a portion are obtained and utilized to generate the sequence of mixed-reality images.

Optionally, the processor is configured to determine whether or not the given real-world environment maps to an existing three-dimensional model, and to utilize the existing three-dimensional model if it is determined that the given real-world environment maps to the existing three-dimensional model. It will be appreciated that three-dimensional models representing spatial geometry and material categories of multiple real objects in various real-world environments could be pre-stored at the memory unit. In such a case, the given real-world environment could map to any of the existing, pre-stored three-dimensional models. Therefore, if it is determined that the given real-world environment maps to the existing three-dimensional model, the processor acquires the identified spatial geometry and the identified material categories of the real objects present in the given real-world environment from the existing three-dimensional model, and uses such acquired information to generate the sequence of mixed-reality images at (iv). Beneficially, in such a case, a processing burden on the processor and a time required to generate the sequence of mixed-reality images are reduced.

Optionally, the processor is configured to:

(vi) generate an audio signal that is representative of an acoustic behaviour of the at least one virtual object, based upon the spatial geometry and the material category of the at least one real object, wherein the acoustic behaviour of the at least one virtual object is to emulate at least one material property associated with the material category of the at least one real object; and (vii) play the audio signal, at the head-mounted display apparatus, substantially simultaneously with the rendering of the sequence of mixed-reality images. In such a case, the acoustic behaviour of the at least one virtual object pertains to an expected audible behaviour of the at least one virtual object, when the sequence of mixed-reality images are rendered to provide the mixed reality environment to the user. Therefore, the audio signal is played substantially simultaneously whilst rendering the sequence of mixed-reality images to enhance acoustic realism within the mixed reality environment. It will be appreciated that the acoustic behaviour of the at least one virtual object varies with its spatial geometry. As an example, a sound produced from a central portion of a virtual xylophone may be different from sounds produced from side portions of the virtual xylophone. Furthermore, the acoustic behaviour of the at least one virtual object varies with the material category of the at least one real object. As an example, a sound produced by a virtual object corresponding to a real metal object may be substantially different from a sound produced by another virtual object corresponding to a real fabric object.

Optionally, the head-mounted display apparatus comprises at least one audio producing device, wherein the at least one audio producing device is configured to play the audio signal substantially simultaneously whilst rendering the sequence of mixed-reality images. More optionally, the head-mounted display apparatus comprises at least a first audio producing device and a second audio producing device, the first audio producing device and the second audio producing device being arranged substantially proximal to a left ear of the user and a right ear of the user, respectively, when the user wears the head-mounted display apparatus on his/her head. Optionally, the at least one audio producing device is implemented by way of at least one electro-acoustic transducer. As an example, the at least one audio producing device may be implemented by way of at least one speaker.

Optionally, the acoustic behaviour of the at least one virtual object is to be indicative of an expected sound produced upon interaction between the at least one virtual object and the at least one other virtual object. It will be appreciated that the interaction between the at least one virtual object and the at least one other virtual object can be optionally determined by analysis of change in spatial geometries of any of such objects, and the expected sound produced upon such interaction is based upon (namely, affected by) the at least one material property associated with the material category of the at least one object.

In an example, a given real-world environment E3 may include a floor and a sink (namely, basin) present therein. Upon analysis of the sequence of images of such a real-world environment E3, the floor may be identified to belong to 'wood' material category and the sink may be identified to belong to 'metal' material category. Furthermore, in the sequence of mixed-reality images corresponding to the given real-world environment E3, the floor and the sink may be represented as virtual objects. Moreover, the sequence of mixed-reality images may also represent a simulated spoon as another virtual object. In such an example, the sequence of mixed-reality images may be generated in a manner that an expected sound S1 produced upon interaction between the wooden floor and the simulated spoon and an expected sound S2 produced upon interaction between the metallic sink and the simulated spoon emulate at least one material property associated with the material categories of the floor and the sink. For example, the 'wood' material category may be associated with higher acoustic absorption as compared to the 'metal' material category. Therefore, the expected sound S1 produced upon interaction between the wooden floor and the simulated spoon may be lesser than the expected sound S2 produced upon interaction between the metallic sink and the simulated spoon.

Optionally, the system is at least communicably coupled to a haptic feedback device, wherein the processor is configured to:

(viii) generate a haptic signal that is representative of a haptic behaviour of the at least one virtual object, based upon the spatial geometry and the material category of the at least one real object, wherein the haptic behaviour of the at least one virtual object is to emulate at least one material property associated with the material category of the at least one real object; and (ix) play the haptic signal, at the haptic feedback device, substantially simultaneously with the rendering of the sequence of mixed-reality images at the head-mounted display apparatus. It will be appreciated that the spatial geometry of the at least one virtual object varies with a perceived distance between the user and the at least one virtual object. Notably, such a perceived distance is substantially similar to a distance between the at least one real object in the given real-world environment and the at least one camera. Therefore, the haptic signal is generated based upon the spatial geometry of the at least one virtual object since the haptic signal is to be played according to the perceived distance between the user and the at least one virtual object (for example, when the user touches the at least one virtual object). Furthermore, the haptic behaviour of the at least one virtual object pertains to an expected tactile behaviour (for example, such as vibration, friction, and so forth) associated with the at least one virtual object, when the sequence of mixed-reality images are rendered to provide the mixed reality environment to the user. Therefore, the haptic signal is played substantially simultaneously at the haptic feedback device whilst rendering the sequence of mixed-reality images, to enhance haptic realism within the mixed reality environment.

Additionally, optionally, the system is physically coupled to the haptic feedback device. For example, the system may be coupled to the haptic feedback device by way of wires.

In an embodiment, the haptic feedback device is integrated with the head-mounted display apparatus. In another embodiment, the haptic feedback device is separate from the head-mounted display apparatus.

Optionally, the haptic feedback device is a wearable device that is to be worn by the user of the head-mounted display apparatus. More optionally, the haptic feedback device comprises at least one haptic element, wherein the haptic feedback device is configured to control the at least one haptic element using the haptic signal, to provide the haptic feedback to the user. Optionally, the at least one haptic element is implemented by way of at least one of: a vibrotactile actuator, a friction modulator.

Optionally, the haptic feedback device is implemented by way of: a haptic glove, a haptic wristband, a haptic clothing, a haptic footwear.

In an example, a given real-world environment E4 may include a mobile phone present therein. Upon analysis of the sequence of images of such a real-world environment E4, a first portion of the mobile phone may be identified to belong to 'glass' material category and a second portion of the mobile phone may be identified to belong to 'metal' material category. Furthermore, in a sequence of mixed-reality images corresponding to the given real-world environment E4, the mobile phone may be represented as a virtual object. Moreover, the sequence of mixed-reality images may also represent a simulated stylus as another virtual object. In such an example, a haptic behaviour of the mobile phone may be vibration of the mobile phone if the user touches the first portion with the stylus. Therefore, the processor may be configured to generate a haptic signal that is representative of the aforesaid haptic behaviour. Furthermore, the processor may play the haptic signal at a haptic feedback device (such as a haptic glove) worn by the user, substantially simultaneously with the rendering of the sequence of mixed-reality images.

In another example, two remotely located users A and B may use different head-mounted display apparatuses in the mixed reality mode to experience a same mixed reality environment that is generated based upon a given real-world environment of the user A. In such a case, the users A and B may engage in a virtual meeting at the given real-world environment of the user A. Furthermore, a processor (of the system) that is communicably coupled to the head-mounted display apparatus of the user A may continuously transmit the sequence of mixed-reality images associated with the given real-world environment of the user A, to another processor that is communicably coupled to the head-mounted display apparatus of the user B. In such an example, if the given real-world environment of the user A includes a jute bag present therein, the jute bag may be identified to belong to 'fabric' material category. Furthermore, a haptic behaviour of the jute bag may be a feeling of friction if the jute bag having a rough surface is touched by a user. Therefore, the processor that is communicably coupled to the head-mounted display apparatus of the user A may generate a haptic signal that is representative of the aforesaid haptic behaviour, and may play the haptic signal at haptic feedback devices (such as haptic gloves) worn by the user A and the user B whilst rendering the sequence of mixed-reality images.

Optionally, the processor is configured to process the sequence of images at (iv) based upon the user's input regarding at least one of: a type of the given real-world environment, the user's preferences. In such a case, the user provides the input at the head-mounted display apparatus. It will be appreciated that the user's input regarding the type of the given real-world environment pertains to a priori knowledge of the given real-world environment. Such a priori knowledge could be beneficially leveraged to accurately identify the spatial geometry and the material categories of the real objects present in the given real-world environment, and could be subsequently utilized to represent realistic visual behaviours of the real objects whilst generating the sequence of mixed-reality images at (iv). Optionally, the type of the given real-world environment is selected from the group consisting of: an indoor environment, an outdoor environment. Furthermore, the user's input regarding his/her preferences allows for generating the sequence of mixed-reality images according to the user's preferences. Optionally, the user's preferences pertain to whether or not the user wishes to experience the acoustic behaviour and/or the haptic behaviour of the at least one virtual object. Furthermore, optionally, the user's preferences pertain to a desired visual behaviour of the at least one virtual object, and optionally, a desired acoustic behaviour and/or a desired haptic behaviour of the at least one virtual object.

Optionally, the processor is configured to capture the sequence of images at (i) based upon the user's input regarding the type of the given real-world environment. Optionally, in this regard, when the type of the given real-world environment is the indoor environment, the processor is configured to capture the sequence of images across at least one spectral band within infrared spectrum and/or near-infrared spectrum.

Furthermore, optionally, whilst imaging indoor environments, the processor is configured to control a flash (namely, an electronic flash unit) for producing light to illuminate the given real-world environment. In an embodiment, the flash is operable to emit light across each of the plurality of spectral bands. In such a case, the image sensor is a monochrome sensor that allows for capturing the sequence of images with substantially high detail (namely, sharpness) and sensitivity. In another embodiment, the flash is operable to emit broadband near-infrared light. In such a case, in the at least one camera, the plurality of optical filters is implemented by way of a spectrally tunable filter (for example, such as the Fabry-Perot Interferometer, the Plasmonic filter, the Liquid Crystal tunable filter, and the like).

Optionally, the head-mounted display apparatus comprises means for detecting a gaze direction of the user, wherein the processor is configured to receive, from said means, information indicative of the detected gaze direction of the user, and to determine a region of interest in the given real-world environment based upon the detected gaze direction, further wherein, when processing the sequence of images at (iv), the processor is configured to select the at least one real object, from amongst the real objects, based upon the region of interest in the given real-world environment. In such a case, the at least one real object that is present in the region of interest is selected to be represented within the sequence of mixed-reality images, thereby, allowing for the sequence of mixed-reality images to be generated in accordance with the gaze direction of the user. Therefore, the mixed reality environment presented upon rendering such sequence of mixed-reality images substantially corresponds to the region of interest in the given real-world environment. In such a case, the user's immersion in the mixed reality mode of the head-mounted display apparatus is enhanced.

It is to be understood that the term "region of interest" relates to a region of the given real-world environment whereat the user is gazing at a given point of time. Furthermore, throughout the present disclosure, the term "means for detecting the gaze direction" used herein relates to specialized equipment for detecting and optionally, following the direction of the user's gaze, when the user views the sequence of images of the given real-world environment. Examples of the means for detecting the gaze direction include contact lenses with sensors, cameras monitoring positions of pupils of the eyes, and so forth. Such means for detecting the gaze direction are well-known in the art. Beneficially, an accurate detection of the user's gaze facilitates the head-mounted display apparatus to closely implement gaze contingency thereon.

Optionally, the system further comprises means for adjusting an orientation of the at least one camera, the head-mounted display apparatus comprising means for tracking a head orientation of the user, wherein the processor is configured to receive, from said means, information indicative of the head orientation of the user, and to control the means for adjusting the orientation of the at least one camera, based upon the head orientation of the user. In such an instance, the orientation of the at least one camera is adjusted to allow for capturing the sequence of images of the given real-world environment, from a perspective of the head orientation of the user. It will be appreciated that such adjustment of the orientation of the at least one camera may be employed in the aforementioned implementation wherein the system is to be integrated with the remote device. Examples of the means for tracking the head orientation of the user include, but are not limited to, a gyroscope, and an accelerometer.

Optionally, the means for adjusting the orientation of the at least one camera comprises at least one actuator. In an embodiment, the remote device is tilted and/or rotated by the at least one actuator for adjusting the orientation of the at least one camera mounted thereon. In another embodiment, the at least one camera is tilted and/or rotated by the at least one actuator.

The present disclosure also relates to the method as described above. Various embodiments and variants disclosed above apply mutatis mutandis to the method.

Optionally, the method further comprises:
(vi) generating the audio signal that is representative of the acoustic behaviour of the at least one virtual object, based upon the spatial geometry and the material category of the at least one real object, wherein the acoustic behaviour of the at least one virtual object emulates the at least one material property associated with the material category of the at least one real object; and
(vii) playing the audio signal at the head-mounted display apparatus substantially simultaneously with the rendering of the sequence of mixed-reality images.

Optionally, the method further comprises:
(viii) generating the haptic signal that is representative of the haptic behaviour of the at least one virtual object, based upon the spatial geometry and the material category of the at least one real object, wherein the haptic behaviour of the at least one virtual object emulates at least one material property associated with the material category of the at least one real object; and
(ix) playing the haptic signal at the haptic feedback device substantially simultaneously with the rendering of the sequence of mixed-reality images at the head-mounted display apparatus.

Optionally, the method further comprises generating and storing the three-dimensional model representing the spatial geometry and the material categories of the real objects in the given real-world environment; and utilizing the three-dimensional model to generate the sequence of mixed-reality images at the step (iv).

Optionally, the method further comprises determining whether or not the given real-world environment maps to the existing three-dimensional model; and utilizing the existing three-dimensional model if it is determined that the given real-world environment maps to the existing three-dimensional model.

Optionally, in the method, the processing of the sequence of images at the step (iv) is performed based upon the user's input regarding at least one of: the type of the given real-world environment, the user's preferences.

Optionally, the method further comprises receiving, from the head-mounted display apparatus, information indicative of the gaze direction of the user; and determining the region of interest in the given real-world environment based upon the gaze direction of the user, wherein the processing of the sequence of images at the step (iv), comprises selecting the at least one real object, from amongst the real objects, based upon the region of interest in the given real-world environment.

Optionally, the method further comprises receiving, from the head-mounted display apparatus, information indicative of the head orientation of the user; and adjusting the orientation of the at least one camera, based upon the head orientation of the user.

The present disclosure also relates to the computer program product as described above. Various embodiments and variants disclosed above apply mutatis mutandis to the computer program product.

Optionally, in the computer program product, when accessed by the processing device, the program instructions cause the processing device to:
(vi) generate the audio signal that is representative of the acoustic behaviour of the at least one virtual object, based upon the spatial geometry and the material category of the at least one real object, wherein the acoustic behaviour of the at least one virtual object is to emulate at least one material property associated with the material category of the at least one real object; and
(vii) play the audio signal, at the head-mounted display apparatus, substantially simultaneously with the rendering of the sequence of mixed-reality images.

Optionally, in the computer program product, when accessed by the processing device, the program instructions cause the processing device to:
(viii) generate the haptic signal that is representative of the haptic behaviour of the at least one virtual object, based upon the spatial geometry and the material category of the at least one real object, wherein the haptic behaviour of the at least one virtual object is to emulate at least one material property associated with the material category of the at least one real object; and
(ix) play the haptic signal, at the haptic feedback device, substantially simultaneously with the rendering of the sequence of mixed-reality images at the head-mounted display apparatus, the haptic feedback device being communicably coupled to the processing device.

DETAILED DESCRIPTION OF THE DRAWINGS

Figure 1B:
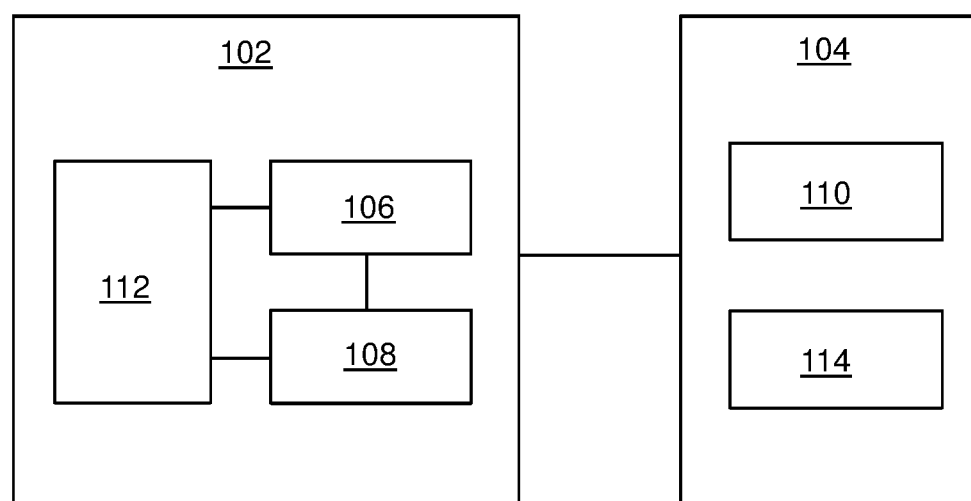

Referring to FIGS. 1A and 1B, illustrated are block diagrams of architectures of a system 102 and a head-mounted display apparatus 104, in accordance with different embodiments of the present disclosure. It may be understood by a person skilled in the art that the FIGS. 1A and 1B include simplified architectures of the system 102 and the head-mounted display apparatus 104 for sake of clarity, which should not unduly limit the scope of the claims herein. The person skilled in the art will recognize many variations, alternatives, and modifications of embodiments of the present disclosure.

In FIGS. 1A and 1B, the system 102 is communicably coupled to the head-mounted display apparatus 104. The system 102 comprises at least one camera, depicted as a camera 106 and a processor 108 communicably coupled to the at least one camera 106.

In FIG. 1B, the head-mounted display 104 apparatus comprises means for detecting a gaze direction 110 of the user. In such a case, the processor 108 is configured to receive, from said means 110, information indicative of the detected gaze direction of the user, and to determine a region of interest in a given real-world environment based upon the detected gaze direction. Furthermore, the system 102 comprises means for adjusting an orientation 112 of the at least one camera 106, and the head-mounted display apparatus 104 comprises means for tracking a head orientation 114 of the user, wherein the processor 108 is configured to receive, from said means 114, information indicative of the head orientation of the user, and to control the means for adjusting the orientation 112 of the at least one camera 106, based upon the head orientation of the user.

Figure 2:
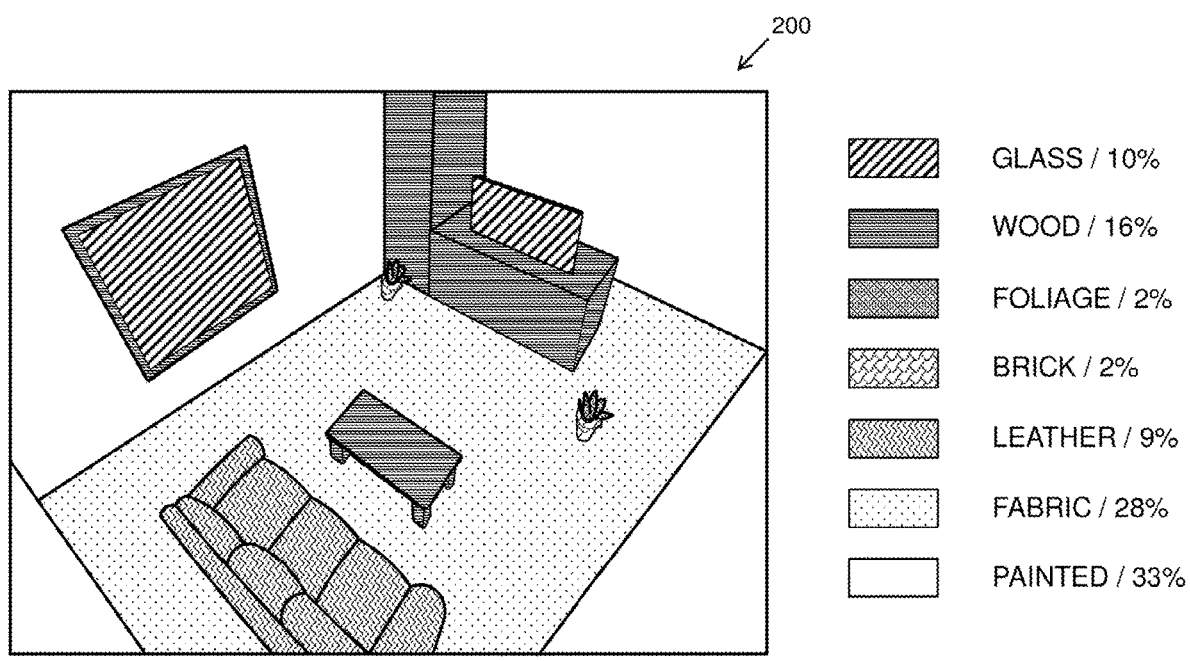
FIG. 2 illustrates an image of a given real-world environment and identified material categories to which real objects or their portions depicted therein belong, in accordance with an embodiment of the present disclosure.

Referring to FIG. 2, illustrated is an image 200 of a given real-world environment and identified material categories to which real objects or their portions depicted therein belong, in accordance with an embodiment of the present disclosure. As shown, the image 200 represents real objects such as a carpet, a couch, a table, a window, a television, potted plants, cupboards and walls present in the given real-world environment. Furthermore, identified categories to which the aforesaid real objects or their portions belong, are annotated as a legend alongside the image 200. Moreover, the legend also describes approximate percentages of the material categories depicted in the image 200. Notably, the real objects or their portions are identified to belong to 7 material categories, such as 'GLASS', 'WOOD', 'FOLIAGE', 'BRICK', 'LEATHER', 'FABRIC' and 'PAINTED'. As an example, the couch is identified to belong to the 'LEATHER' material category. As another example, a first portion of the window (notably, a frame of the window) is identified to belong to the 'WOOD' material category whereas a second portion of the window (notably, a body of the window) is identified to belong to the 'GLASS' material category.

It may be understood by a person skilled in the art that the FIG. 2 depicts the simplified image 200 of the given real-world environment for the sake of clarity only, which should not unduly limit the scope of the claims herein. The person skilled in the art will recognize many variations, alternatives, and modifications of embodiments of the present disclosure.

Figure 3A:
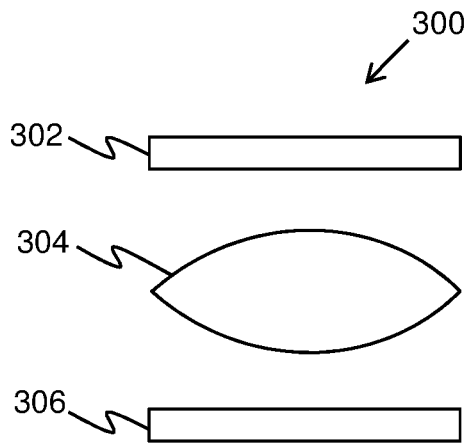
FIGS. 3A and 3B illustrate arrangements of components within a given camera, in accordance with different embodiments of the present disclosure.
Figure 3B:
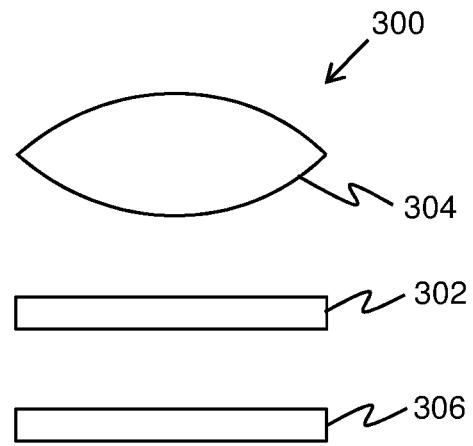

Referring to FIGS. 3A and 3B, illustrated are arrangements of components within a given camera 300, in accordance with different embodiments of the present disclosure. For sake of simplicity and clarity, FIGS. 3A and 3B, a plurality of optical filters are integrated into a single chip 302. In FIG. 3A, a lens 304 is arranged between the plurality of optical filters 302 and an image sensor 306. In FIG. 3B, the plurality of optical filters 302 are arranged between the lens 304 and the image sensor 306.

Figure 4:
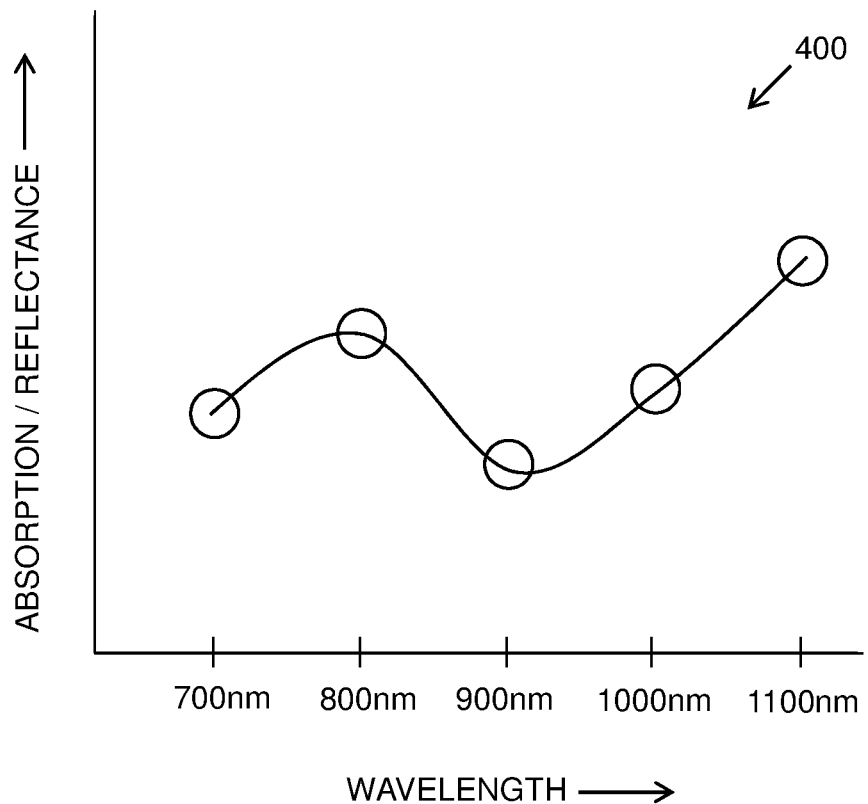
FIG. 4 illustrates spectral response of real objects present in a given real-world environment, in accordance with an embodiment of the present disclosure.

Referring to FIG. 4, illustrated is a spectral response 400 of real objects present in a given real-world environment, in accordance with an embodiment of the present disclosure. The spectral response 400 relates to a variation of absorption or reflectance characteristics of material category of the real objects (depicted on the vertical axis) with respect to wavelength (depicted on the horizontal axis). As shown, spectral footprints of the real objects are depicted as circles.

Figure 5:
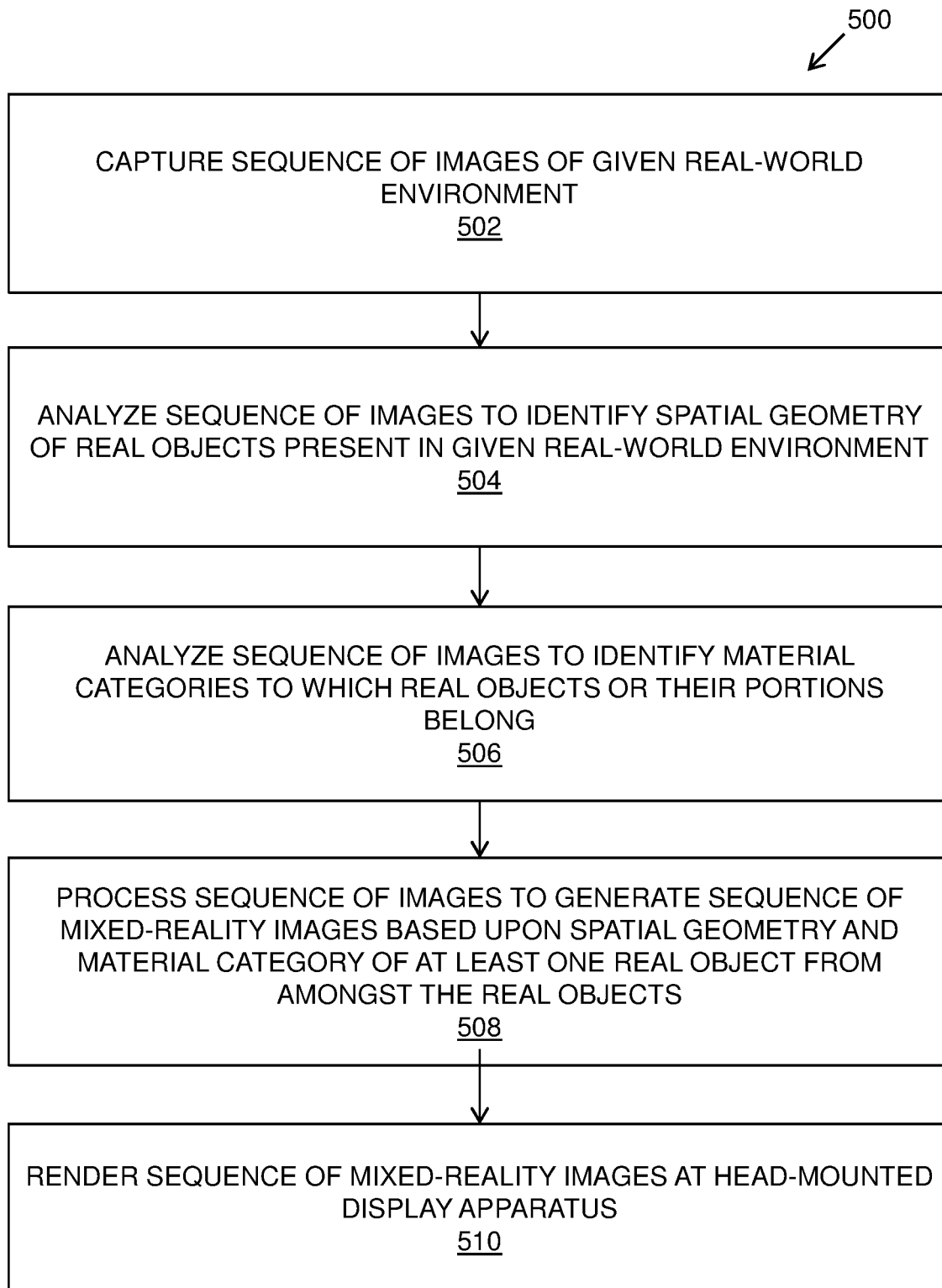
FIG. 5 illustrates steps of a method of enhancing a user's immersion in a mixed reality mode of a head-mounted display apparatus, in accordance with an embodiment of the present disclosure.

Referring to FIG. 5, illustrated are steps of a method 500 of enhancing a user's immersion in a mixed reality mode of a head-mounted display apparatus, in accordance with an embodiment of the present disclosure. At step 502, a sequence of images of a given real-world environment is captured via at least one camera. At step 504, the sequence of images is analyzed to identify a spatial geometry of real objects present in the given real-world environment. At step 506, the sequence of images is analyzed to identify material categories to which the real objects or their portions belong, wherein each real object or its portion belongs to its corresponding material category. At step 508, the sequence of images is processed to generate a sequence of mixed-reality images based upon the spatial geometry and the material category of at least one real object from amongst the real objects. The at least one real object is represented by at least one virtual object in the sequence of mixed-reality images. The sequence of mixed-reality images is generated in a manner that a visual behaviour of the at least one virtual object in the sequence of mixed-reality images emulates at least one material property associated with the material category of the at least one real object. At step 510, the sequence of mixed-reality images are rendered at the head-mounted display apparatus.

The steps 502 to 510 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for enhancing a user's immersion in a mixed reality mode of a head-mounted display apparatus, comprising:
　at least one camera; and
　a processor communicably coupled to the at least one camera, wherein the processor is configured to:
　　control the at least one camera to capture a sequence of images of a given real-world environment;
　　analyze the sequence of images to identify a spatial geometry of real objects present in the given real-world environment;
　　generate material segmentation information from the sequence of images to identify material categories to which one or more portions of the real objects belong;
　　process the sequence of images to:
　　　generate a sequence of mixed-reality images, based upon the spatial geometry of at least one of the real objects and the material categories of one or more portions of at the least one real object; and
　　　represent the at least one real object by at least one virtual object in the sequence of mixed-reality images having a visual behaviour emulating material properties associated with the material categories of the one or more portions of the at least one real object; and
　　render, at the head-mounted display apparatus, the sequence of mixed-reality images.

2. The system of claim 1, wherein the visual behaviour of the at least one virtual object includes at least one of: an appearance of the at least one virtual object, an expected physical interaction between the at least one virtual object and at least one other virtual object, visible interaction of the at least one virtual object with a user, a lighting effect expected from a surface of the at least one real object.

3. The system of claim 1, wherein the system is at least communicably coupled to a haptic feedback device, wherein the processor is configured to:

generate a haptic signal that is representative of a haptic behaviour of the at least one virtual object, based upon the spatial geometry and the material category of the at least one real object, wherein the haptic behaviour of the at least one virtual object is to emulate at least one material property associated with the material category of the at least one real object; and play the haptic signal, at the haptic feedback device, substantially simultaneously with the rendering of the sequence of mixed-reality images at the head-mounted display apparatus.

4. The system of claim 1, wherein the processor is configured to generate and store a three-dimensional model representing the spatial geometry and the material categories of the real objects in the given real-world environment, and to utilize the stored three-dimensional model to generate the sequence of mixed-reality images.

5. The system of claim 4, wherein the processor is configured to utilize the existing three-dimensional model if it is determined that the given real-world environment maps to the existing three-dimensional model.

6. The system of claim 1, wherein the processor is configured to process the sequence of images based upon the user's input regarding at least one of: a type of the given real-world environment, the user's preferences.

7. The system of claim 1, wherein the head-mounted display apparatus comprises means for detecting a gaze direction of the user, wherein the processor is configured to receive, from said means, information indicative of the detected gaze direction of the user, and to determine a region of interest in the given real-world environment based upon the detected gaze direction, further wherein, when processing the sequence of images at (iv), the processor is configured to select the at least one real object, from amongst the real objects, based upon the region of interest in the given real-world environment.

8. The system of claim 1, further comprising means for adjusting an orientation of the at least one camera, the head-mounted display apparatus comprising means for tracking a head orientation of the user, wherein the processor is configured to receive, from said means, information indicative of the head orientation of the user, and to control the means for adjusting the orientation of the at least one camera, based upon the head orientation of the user.

9. A method of enhancing a user's immersion in a mixed reality mode of a head-mounted display apparatus, the method comprising:

capturing, via at least one camera, a sequence of images of a given real-world environment;

analyzing the sequence of images to identify a spatial geometry of real objects present in the given real-world environment;

generating material segmentation information from the sequence of images to identify material categories to which one or more portions of the real objects belong;

processing the sequence of images to:

generate a sequence of mixed-reality images, based upon the spatial geometry of at least one of the real objects and the material categories of one or more portions of the at least one real object; and represent the at least one real object by at least one virtual object in the sequence of mixed-reality images having a visual behaviour emulating material properties associated with the material categories of the one or more portions of the at least one real object; and rendering, at the head-mounted display apparatus, the sequence of mixed-reality images.

10. The method of claim 9, wherein the visual behaviour of the at least one virtual object includes at least one of: an appearance of the at least one virtual object, an expected physical interaction between the at least one virtual object and at least one other virtual object, visible interaction of the at least one virtual object with a user, a lighting effect expected from a surface of the at least one real object.

11. The method of claim 9, further comprising:

generating a haptic signal that is representative of a haptic behaviour of the at least one virtual object, based upon the spatial geometry and the material category of the at least one real object, wherein the haptic behaviour of the at least one virtual object emulates at least one material property associated with the material category of the at least one real object; and playing the haptic signal, at a haptic feedback device, substantially simultaneously with the rendering of the sequence of mixed-reality images at the head-mounted display apparatus.

12. The method of claim 9, further comprising generating and storing a three-dimensional model representing the spatial geometry and the material categories of the real objects in the given real-world environment; and utilizing the three-dimensional model to generate the sequence of mixed-reality images.

13. The method of claim 12, further comprising determining whether or not the given real-world environment maps to an existing three-dimensional model; and utilizing the existing three-dimensional model if it is determined that the given real-world environment maps to the existing three-dimensional model.

14. The method of claim 9, wherein the processing of the sequence of images is performed based upon the user's input regarding at least one of: a type of the given real-world environment, the user's preferences.

15. The method of claim 9, further comprising receiving, from the head-mounted display apparatus, information indicative of a gaze direction of the user; and determining a region of interest in the given real-world environment based upon the gaze direction of the user, wherein the processing of the sequence of images comprises selecting the at least one real object, from amongst the real objects, based upon the region of interest in the given real-world environment.

16. The method of claim 9, further comprising receiving, from the head-mounted display apparatus, information indicative of a head orientation of the user; and adjusting an orientation of the at least one camera, based upon the head orientation of the user.

17. A computer program product comprising a non-transitory machine-readable data storage medium having stored thereon program instructions that, when accessed by a processing device, cause the processing device to:

receive, from at least one camera, a sequence of images of a given real-world environment, the at least one camera being communicably coupled to the processing device;

analyze the sequence of images to identify a spatial geometry of real objects present in the given real-world environment;

generate material segmentation information from the sequence of images to identify material categories to which one or more portions of the real objects belong;

process the sequence of images to:

generate a sequence of mixed-reality images, based upon the spatial geometry of at least one of the real objects and the material categories of one or more portions of at the least one real object; and represent the at least one real object by at least one virtual object in the sequence of mixed-reality images having a visual behaviour emulating material properties associated with the material categories of the one or more portions of the at least one real object; and render, at a head-mounted display apparatus, the sequence of mixed-reality images, the head-mounted display apparatus being communicably coupled to the processing device.

18. The computer program product of claim 17, wherein the visual behaviour of the at least one virtual object includes at least one of: an appearance of the at least one virtual object, an expected physical interaction between the at least one virtual object and at least one other virtual object, visible interaction of the at least one virtual object with a user, a lighting effect expected from a surface of the at least one real object.

19. The computer program product of claim 17, wherein, when accessed by the processing device, the program instructions cause the processing device to:

generate a haptic signal that is representative of a haptic behaviour of the at least one virtual object, based upon the spatial geometry and the material category of the at least one real object, wherein the haptic behaviour of the at least one virtual object is to emulate at least one material property associated with the material category of the at least one real object; and play the haptic signal, at a haptic feedback device, substantially simultaneously with the rendering of the sequence of mixed-reality images at the head-mounted display apparatus, the haptic feedback device being communicably coupled to the processing device.

20. The computer program product of claim 17, that further causes the processing device to:

generate and store a three-dimensional model representing the spatial geometry and the material categories of the real objects in the given real-world environment;

utilize the three-dimensional model to generate the sequence of mixed-reality images;

determine whether or not the given real-world environment maps to an existing three-dimensional model; and utilize the existing three-dimensional model if it is determined that the given real-world environment maps to the existing three-dimensional model.

* * * * *